United States Patent [19]

Kishimoto et al.

[11] 3,789,085

[45] Jan. 29, 1974

[54] POLYETHYLENE BLOCK-GRAFT COPOLYMERS AND METHOD FOR PREPARING THE SAME

[75] Inventors: Akira Kishimoto, Ota; Sadao Hirata; Hiroshi Ueno, both of Kanagawa, all of Japan

[73] Assignee: Toyo Seikan Kaisha, Ltd., Tokyo, Japan

[22] Filed: Nov. 30, 1971

[21] Appl. No.: 203,252

Related U.S. Application Data

[63] Continuation-in-part of Ser. No. 862,392, Sept. 30, 1969, abandoned.

[30] Foreign Application Priority Data

Oct. 9, 1968 Japan................................ 43-73179

[52] U.S. Cl....... 260/897 B, 260/878 R, 260/878 B, 260/897 A, 260/897 C
[51] Int. Cl. .........................................C08f 29/12
[58] Field of Search............................ 260/897, 878

[56] References Cited
UNITED STATES PATENTS

| | | | |
|---|---|---|---|
| 3,299,181 | 1/1967 | Coover et al. | 260/897 |
| 3,256,362 | 6/1966 | Craubner et al. | 260/862 |
| 3,422,055 | 1/1969 | Maloney | 260/41 |
| 3,549,727 | 12/1970 | Coates et al. | 260/897 |
| 3,299,194 | 1/1967 | Golike | 260/897 |
| 3,399,250 | 8/1968 | Kirk et al. | 260/897 |

Primary Examiner—Murray Tillman
Assistant Examiner—C. J. Seccuro
Attorney, Agent, or Firm—E. F. Wenderoth et al.

[57] ABSTRACT

The present invention provides a block-graft copolymer of polyethylene and saponified ethylene vinyl acetate with improved moisture permeability by heating a mixture of polyethylene and a saponified ethylene-vinyl acetate copolymer to an elevated temperature and kneading the mixture under pressure. The saponified ethylene-vinyl acetate copolymer has a degree of saponification of 99% or more and consists of from 30 to 50 mol percent of ethylene, the remainder being vinyl acetate, the polyethylene being a powdery high density polyethylene which has not been subjected to heating and kneading after polymerization, the mixture containing the high density polyethylene and the saponified ethylene-vinyl acetate copolymer at a weight ratio of 98:2 to 80:20 and from 0.2 to 0.6 percent by weight based on the weight of the mixture, of a radical forming catalyst, and the mixture being heated to a temperature of from 200° to 205°C and kneaded under a pressure of 330 to 470 kg/cm².

3 Claims, 8 Drawing Figures

POLYETHYLENE BLOCK-GRAFT COPOLYMERS AND METHOD FOR PREPARING THE SAME

CROSS-REFERENCE TO RELATED APPLICATIONS:

This application is a continuation-in-part patent application, of Ser. No. 862,392, filed on Sept. 30, 1969, now abandoned.

BACKGROUND OF THE INVENTION

This invention relates to a polymer alloy composed mainly of block-graft copolymers containing ethylene as the skeleton and a method of preparing the polymer alloys, and more particularly to a novel method of manufacturing synthetic resins for use in the art of moulding and having improved moisture permeability, organic liquid permeability, environmental stress cracking property, heat shrinkage and other various characteristics by heating and kneading a mixture of powdery high density polyethylene resins which have been polymerized but not heated and kneaded and a saponified ethylene-vinyl acetate copolymer, in the presence of a free radical forming catalyst or compound.

Organic synthetic resins in the form of films, laminations, bottles, fibers or containers in the form of various configurations are now widely used to pack foodstuffs, toilet goods, medical supplies and various other commercial products. Especially, polyethylene, polystyrene, polyvinyl chloride and the like are widely used for the preparation of packing films, bottles and other containers because they have excellent properties and can be readily produced at low cost on mass production basis. However, polyethylene, for example, is permeable to straight chain hydrocarbons, aromatic hydrocarbons, esters, ketones and other organic solvents. Further, polystyrene and polyvinyl chloride are permeable to above described organic liquids and inorganic liquids such as water, and in addition they manifest poor shockproofness, environmental stress cracking property and heat shrinking property. To eliminate these defects of various resins it has been proposed to blend homologous high molecular resins or to synthesize random copolymers from monomers. However, mixtures and copolymers obtained by such methods merely show properties intermediate of respective properties of respective components so that it is impossible to radically improve the characteristics of the products. Commercially available granular or pulverized high density polyethylene resins which have been subjected to heating and kneading after polymerization generally lack compatibility with other type polymerized polyethylene resins so that improvement in the quality by blending can not be expected. More recently, various methods have been developed wherein homologous block copolymers of the polyester series or of polyamide series are synthesized by the ester exchange reaction or amide exchange reaction or wherein block copolymers or graft copolymers are synthesized from monomers. However, these methods are not suitable for practical use because of high cost of manufacturing involved.

Mixtures and graft copolymers of polyolefin and other polymers are disclosed in U.S. Pat. Nos. 3,093,255 and 3,261,885. The former relates to a blend of polyolefin and polyamide while the latter to a method of preparing a block-graft copolymer by kneading a mixture of a homopolymer or copolymer of olefin and styrene, and a linear polyamide having —NHCO— radicals in the presence of a free radical forming catalyst.

As above described, in the methods disclosed in these patents, polymers which can be used with polyolefin are limited to highly reactive polyamide. This invention is different from these prior art in that it is characterized by blending polyethylene resins with a saponified ethylenevinyl acetate copolymer having low reactivity thereto in the presence of a free radical forming catalyst. Further this invention is also different from said prior patents in that polyethylene resins are limited to powdery high density polyethylene resins which are not yet subjected to heating and kneading after polymerization.

SUMMARY OF THE INVENTION

It is an object of this invention to provide a novel block-graft copolymer and a novel method of manufacturing synthetic resins for use in the art of moulding wherein a mixture of powdery high density polyethylene resins which are not yet subjected to such operations as heating and kneading after polymerization and a saponified ethylenevinyl acetate copolymer is heated and kneaded in the presence of a radical forming catalyst. Containers moulded from the novel resins manifest excellent moisture permeability, organic liquid permeability, environmental stress cracking property and heat shink property which are lower than those of respective raw material resins. Thus, for example, while the moisture permeability (measured by JIS Z 0208) of high density polyethylene is about 5 $g/m^2 \cdot day \cdot 50\ \mu$ and that of polystyrene resin is about 40 $g/m^2 \cdot day \cdot 50\ \mu$, the novel polyethylene·polystyrene moulding resin shows a moisture permeability ranging from 0.5 $g/m^2 \cdot day \cdot 50\ \mu$ to 3 $g/m^2 \cdot day \cdot 50\ \mu$ which is much lower than that of each component resin.

The term "powdery high density polyethylene resins" utilized in this specification means homopolymers or copolymers which have a specific gravity of higher than 0.94 and prepared by polymerizing, under a low pressure or a medium pressure, ethylene or a mixture of ethylene, the major component, and other olefin monomer, such as butene, hexene, octene, propylene and which have not been subjected to any operations such as heating and kneading after polymerization. Although, resins having a melt index of less than 15.0 g/10 min. (ASTM, D–1238) are effective resins having, a melt index of less than 1.0 g/10 min. are preferred. These resins are in the form of a powder and the preferred mean grain size is less than 2,000 $\mu$.

As above described, according to this invention, to a not kneaded powdery high density polyethylene resin is added a saponified ethylene-vinyl acetate copolymer at a weight ratio of 98 : 2 to 80 : 20. The saponified ethylene-vinyl acetate copolymer employed in this invention contains 30 – 50 mol percent of ethylene and has a degree of saponification of 99 percent or more and a melt viscosity of 170,000 poise at a temperature of 190°C and under a rate of shear at 30 sec.$^{-1}$.

As the radical forming catalyst, there may be used azo compounds, peroxide, and the like. Examples of such catalysts are 2,2′-azobisisobutyronitrile, benzoyl peroxide, benzoin peroxide, benzo-benzoyl peroxide, anthracene, chloroanthraquinone or the like. Concentration of the radical forming catalyst varies, dependent upon the type of the substance formed. Concentration of from 0.005 to 10.0 parts, based upon 100 parts of the resin mixture, is effective but concentration of less than 5.0 parts is preferred.

As the kneading device may be used a conventional screw type extruder, heated rolls, a Bumbury's mixer or the like. Kneading conditions depend upon the type of saponified ethylene-vinyl acetate copolymers, especially their thermal characteristics as well as the types of the radical forming catalysts and kneading machines used. However, with heat kneading with the screw type extruder, resin pressure at the exit end of the screw of more than 100 kg/cm$^2$, the temperature of the die ranging from 155°C to 290°C and the number of revolutions of the screw ranging from 25 to 45 rpm are preferred.

ture permeability and excellent organic liquid permeability environmental stress cracking property and heat shrink property.

Where granular or pulverized high density polyethylene resins which have undergone heating and kneading after polymerization are used above described good results can not be obtained.

Table 1 below shows comparison between various characteristics of resinous compositions which are heat kneaded by the same screw type extruder, one of the compositions comprising a high density polyethylene resin which was not subjected to heat kneading after polymerization (Sample a) and the other the same type resin but has been kneaded after polymerization (Sample b).

Table 1

| Samples | A | B | C | D | E | F | G | H | I | J |
|---|---|---|---|---|---|---|---|---|---|---|
| Sample a | 0.34 | 2.8×10$^5$ | 1.94 | 1.69 | 2.3×10$^4$ | 12.1 | 3.1 | 3.4 | 3.2 | 8.9 |
| Same resin but kneaded once | 0.18 | 8.0×10$^5$ | 2.79 | 2.75 | 5.1×10$^4$ | 17.6 | 6.6 | 8.0 | 1.7 | 4.3 |
| Sample b | 0.36 | 2.1×10$^5$ | 2.64 | 1.62 | 1.9×10$^4$ | 16.5 | 2.9 | 3.2 | 2.0 | 5.5 |
| Same resin but kneaded once | 0.33 | 3.2×10$^5$ | 2.57 | 1.70 | 2.0×10$^4$ | 16.8 | 2.1 | 5.4 | 1.9 | 5.0 |

A: melt index (g/10 min)
B: apparent viscosity, at 190°C, 1.0 sec$^{-1}$ (poises)
C: swelling ratio, at 190°C, 100 sec$^{-1}$
D: intrinsic viscosity (100 ml/g)
E: number average molecular weight
F: molecular weight distribution (calculated from the weight average molecular weight and the number average molecular weight)
G: gel fraction (%)
H: number of total methyl radicals (per 1000 carbon atoms)---'
I: coefficient of light absorption of ethyl branch---'
J: coefficient of light absorption of terminal vinyl radicals---'

---: Obtained by infrared spectro-analysis.

When utilizing heated rolls in nitrogen atmosphere, roll temperature ranging from 150°C to 230°C, number of revolutions of rolls ranging from 15 to 30 rpm and kneading time ranging from 5 to 15 minutes are preferred. When effecting heating and kneading by utilizing a Bumbury's mixer, resin temperature of 130°C to 230°C, number of revolutions of the rotor of 15 to 35 rpm. and kneading time ranging from 3 to 8 minutes are preferred. Utilization of more effective kneading device results in the reduction of the kneading time. Although kneading temperature varies dependent upon the type of the kneading device, melting point of the saponified ethylene-vinyl acetate copolymer used and other factors, generally temperatures 30°C to 250°C higher than the melting point of the powdery high density polyethylene resins are preferred.

When moulded by a conventional extruder or an injection moulding machine, the synthetic resin prepared as above described or a room temperature mixture thereof with a powdery high density polyethylene resin which is not yet subjected to heating and kneading after polymerization gives moulded articles having low mois- As can be clearly noted from table 1 changes in the melt index, apparent viscosity (at 1.0 sec.$^{-1}$), swelling ratio (at 100 sec.$^{-1}$), intrinsic viscosity, number average molecular weight, molecular weight distribution ($\overline{M}_w/\overline{M}_n$), gel fraction, number of total methyl radicals, number of ethyl radicals branched, and number of terminal vinyl radicals are more remarkable in the high density polyethylene resin not heat kneaded after polymerization than the same type resin which has been kneaded. From these results it can be presumed that in the high density polyethylene resin, the first heat kneading operation after polymerization results in a high mechanical and chemical reactivity in the molecules causing above described changes in the molecular characteristics. On the other hand, in the vinyl polymerization type resins heat kneading operation crates mechano-chemical reactivity. As an example, changes in the melt viscosity (190°C, 30 sec.$^{-1}$) and intrinsic viscosity (solvent: a mixture of 85 percent by weight of phenol and 15 percent by weight of water, temperature: 30°C) caused by kneading of a polyvinyl chloride having a mean degree of polymerization of 800 are shown in table 2.

Table 2

| Sample | A | B |
|---|---|---|
| Saponified ethylene-vinyl acetate copolymer | $1.7 \times 10^5$ | 0.11 |
| Same resin but kneaded once | $3.2 \times 10^5$ | 0.14 |

A: Apparent viscosity (poise) at 190°C, and at a rate of shear of 30 sec$^{-1}$.
B: Intrinsic viscosity at 30°C, solvent – a mixture of 85 percent, by weight of phenol and 15 percent, by weight of water.

The saponified ethylene-vinyl acetate copolymer was kneaded with an extruder having a screw, 40 mm diameter, and 1,120 mm long and rotated at a speed of 45 rpm. The temperature of the die was 230°C. Further the result of analysis by the nuclear magnetic resonance method shows that the pattern of the resin prepared by this invention is similar to those of block copolymers regarding respective components and that the percentage of solvent extraction of the novel synthetic resin is much smaller than that of the case wherein the high density polyethylene resin heat kneaded after polymerization was blended. As shown in table 3 below heats of fusion of respective crystals as determined by the differential thermal analysis technique is different from the synthetic resin prepared in accordance with this invention and for a composition prepared by kneading a mixture of the same type pulverized high density polyethylene heat kneaded after polymerization and vinyl polymerization type resins.

Table 3

| | A*1) | A*2) | B*1) | B*2) |
|---|---|---|---|---|
| High density polyethylene resin$^{=3)}$ | 51 | 50 | — | — |
| 90/10 | 53 | 46 | 8.9 | 6 |
| 80/20 | 49 | 41 | 10 | 12 |
| Saponified ethylene-vinyl acetate copolymer | — | — | 22 | 22 |

-1): Powdery high density polyethylene resin not kneaded after polymerization
-2): High density polyethylene resin kneaded after polymerization
-3): Melt index: 0.8
A: Heats of fusion (cal/g) of high density polyethylene crystals
B: Heats of fusion (cal/g) of saponified ethylenevinyl acetate copolymer From these results it can be thought that heat kneading operation carried out in the presence of a radical forming catalyst is effective to greatly activate unsaturated radicals, methyl radicals and other radicals contained in respective resins thus forming block copolymers of high density polyethylene resins and saponified ethylene-vinyl acetate copolymer, or graft copolymers or crosslinked polymers thereof represented by the general formula

```
                        B
                        B
                        :
                        B
                        B
  AAABBB...  BBBAAA...  AAA
             A
             A
             A
             :
             A
             A
``` where A represents high density polyethylene resins and B saponified ethylene-vinyl acetate copolymer. Thus, the product is not a mere blend but it is considered that new substances are formed whose structure has been chemically changed, and that such novel substances contribute to the improvement of various characteristics, such as moisture permeability and others described above.

The term "moulded articles," herein used, is intended to cover articles of any geometrical configuration, such as films, sheets, tubes, fibers, bottles and the like.

BRIEF DESCRIPTION OF THE DRAWING

In the accompanying drawing.

DESCRIPTION OF THE PREFERRED EMBODIMENTS

The following specific examples are given by way of illustration, and are not to be considered as limiting in any way the scope and spirit of the invention.

EXAMPLE 1

In order to determine whether chemical change occurs or not in the structure when a mixture of a powdery high density polyethylene resin not kneaded after polymerization and a vinyl polymerization type resin is heat kneaded in the presence of a radical forming catalyst, a powdery high density polyethylene resin not kneaded after polymerization and having a melt index of 0.6 (ASTM D–1238), and a melt viscosity of 180,000 poise at a temperature of 190°C and under a rate of shear at 30 sec.$^{-1}$ (a homopolymer, but incorporated with 0.05 part of ionol anti-oxidant) and a propylene resin having a flow rate of 1.0, and a melt viscosity of 120,000 poise at a temperature of 190°C and a rate of shear at 30 sec.$^{-1}$ were admixed at room temperature and at a weight ratio of 80 : 20. As the radical forming catalyst, 0.10 part of 2,2-azobisiso butyronitrile was incorporated to the mixture and the resulting mixture was subjected to heat kneading process which was conducted in a vented extruder provided with a nylon type screw, 40 mm diameter and 1,120 mm effective length. The conditions of heat kneading were: the temperature of the resin at the die was 265°C, the resin pressure at the discharge end of the screw was 115 kg/cm² and the number of revolutions of the screw was 29 rpm.

For comparison, the same type high density polyethylene resin but once heat kneaded after polymerization was admixed with the same type polypropylene resin at a weight ratio of 80 : 20 .0.10 part of 2,2-azobisiso butyronitrile was incorporated and the resulting mixture was heat kneaded with the same extruder under the same extrusion conditions.

Figure 1:
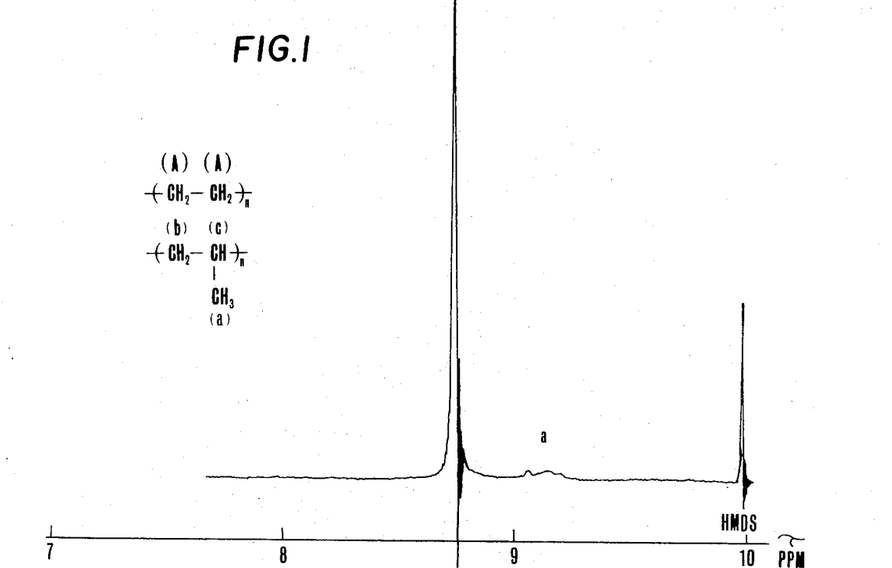
FIG. 1 shows a NMR spectrogram of an ethylene propylene block copolymer.
Figure 2:
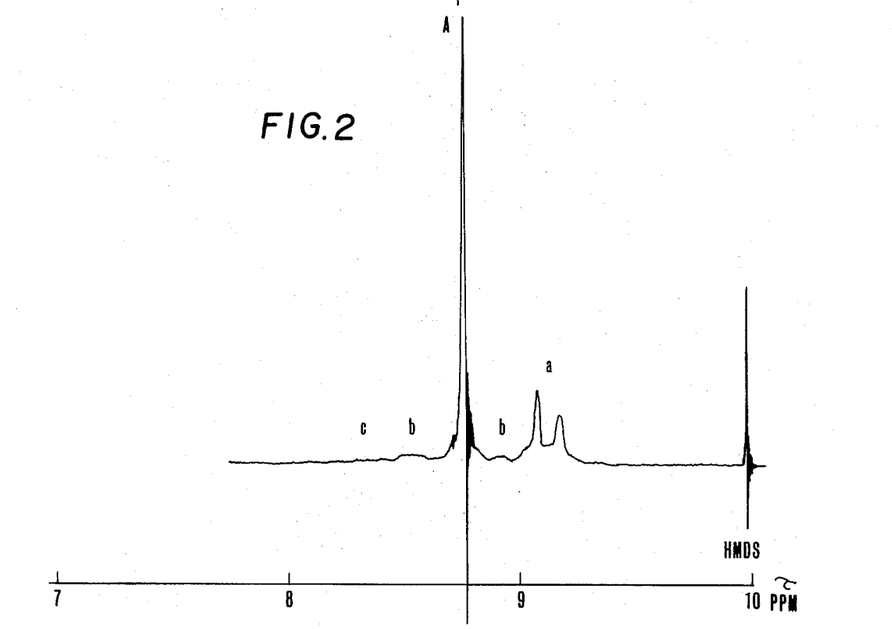
FIG. 2 shows a NMR spectrogram of a polyethylene polypropylene blend (a mixture at room temperature)
Figure 3:
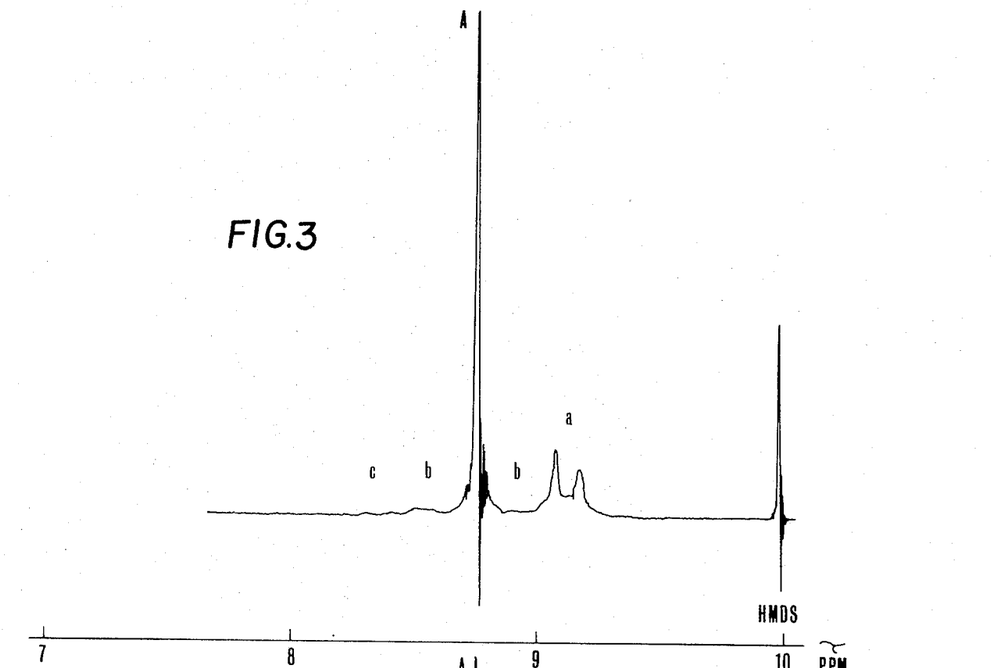
FIG. 3 shows a NMR spectrogram of the same resin as in FIG. 2, but polyethylene was subjected to heat kneading process.
Figure 4:
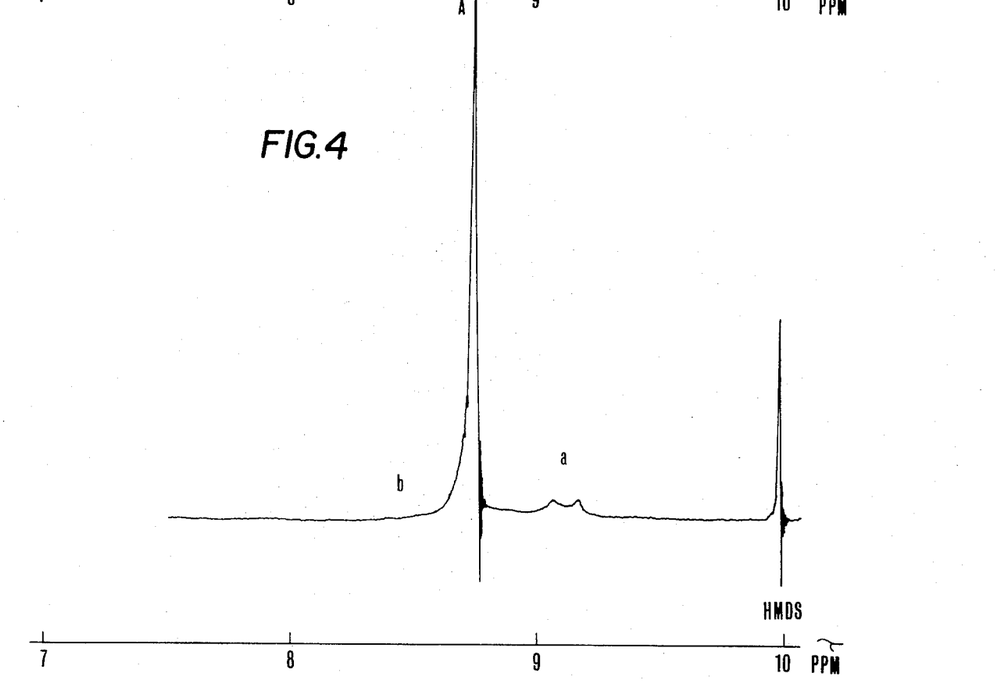
FIG. 4 shows a NMR spectrogram of the novel polyethylene polypropylene block-graft copolymer (polyethylene: powdery high density polyethylene)

An ethylene-propylene block copolymer was prepared by first polymerizing propylene in a solvent in the presence of triethyl aluminum and titanium tetrachloride and then effecting addition polymerization of ethylene monomer to said living polymer, the ratio of ethylene propylene in the copolymer composition being 79 : 21. NMR spectra were determined by means of a nuclear magnetic resonance device operating at 60 MHz on three types of resins synthetized as above described and a room temperature mixture of the same type high density polyethylene but once kneaded after polymerization and the same type polypropylene (at the weight ratio of 80 : 20). Hydrogen protons were used as the nuclei, purified orthodichloro benzene as the solvent. Measuring temperature was 160°C for all samples while the concentration of each sample was 6.0 percent. All other measuring conditions were maintained constant. The NMR spectrum for the ethylene-propylene block copolymer is shown in FIG. 1, that for a room temperature mixture of heat kneaded high density polyethylene and polypropylene in FIG. 2, that for the mixture consisting of high density polyethylene once kneaded after polymerization and polypropylene, said mixture being kneaded in an extruder, is shown in FIG. 3 and that for the synthetic resin prepared according to this example in FIG. 4. By comparing FIGS. 1 and 2 it will be noted that signal intensities manifested by the protons of methyl, methylene and methine (represented by a, b and c respectively in FIG. 1 to 4) radicals contained in propylene of the ethylene-propylene block copolymer are less than those of the room temperature mixture. According to the result (shown in FIG. 3) of the mixture prepared by admixing heat kneaded high density polyethylene and polypropylene and then kneading in an extruder, the intensity of each signal is substantially the same as that (FIG. 2) of the room temperature mixture. On the contrary, according to the result of the synthetic resin utilizing the not kneaded polyethylene, signal intensities of the protons of the methyl, methylene and methine radicals contained in propylene are smaller than those of the room temperature mixture but resemble to signal intensities manifested by the ethylene-propylene block copolymer. Thus, it will be noted that synthetic resins prepared in accordance with this example are different from a mere blend of polyethylene and polypropylene.

EXAMPLE 2

Figure 5:
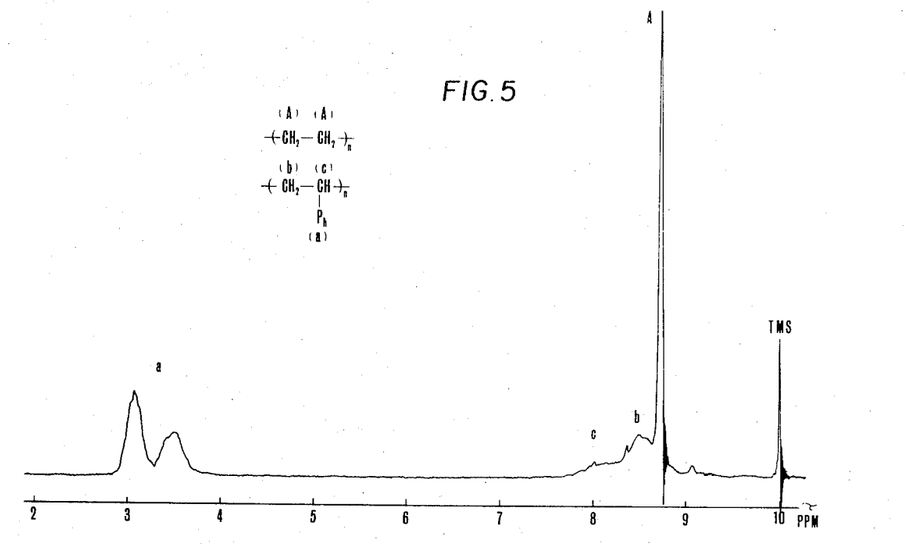
FIG. 5 shows a NMR spectrogram of a polyethylene polystyrene resin (a mixture at room temperature)
Figure 6:
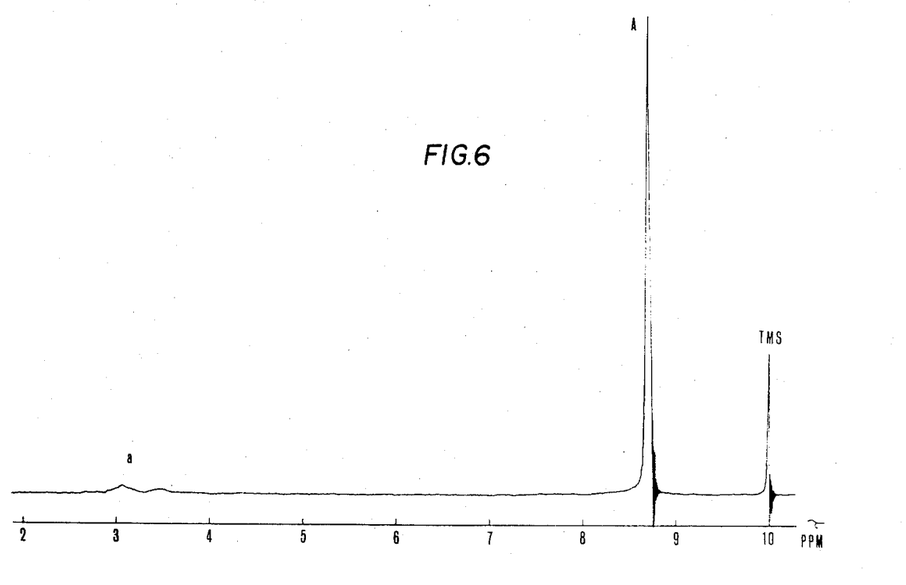
FIG. 6 shows a NMR spectrogram of the novel polyethylene polystyrene block-graft copolymer (polyethylene:powdery high-density polyethylene)

In order to determine whether chemical change occurs or not in the composition when a mixture of a powdery high density polyethylene resin not kneaded after polymerization and a vinyl polymerization type resin is heat kneaded in the presence of a radical forming catalyst, a powdery high density polyethylene resin having a melt index of 0.3 (ASTM D–1238) and a melt viscosity of 220,000 poise at a temperature of 190°C and under a rate of shear of 30 sec.$^{-1}$ (an ethylene-butene copolymer and incorporated with 0.05 part of ionol antioxidant), and a polystyrene resin having a rate of shear of 3.5 (ASTM D–1238) and a melt viscosity of 160,000 poise at a temperature of 190°C and under a rate of shear at 30 sec.$^{-1}$ were admixed at room temperature and at a weight ratio of 80 : 20. 0.25 part of 2,2-azobisiso butyronitrile acting as the radical forming catalyst was incorporated into the mixture and the resulting mixture was subjected to heat kneading treatment which was conducted in a vented extruder provided with a nylon screw, 40 mm diameter and 1120 mm effective length. Heat kneading conditions were: the resin temperature at the die was 240°C, the resin pressure at the discharge end of the screw was 160 kg/cm² and the number of revolutions of the screw was 27 rpm. NMR spectra were determined by means of a nuclear magnetic resonance device operating at 60 MHz on the synthetic resin prepared as above described and on a room temperature mixture consisting of the same type high density polyethylene resin once heat kneaded after polymerization and the same type polystyrene resin at a weight ratio of 80 : 20. Again hydrogen protons were used as the nuclei, purified tetrachloride as the solvent. Measuring temperature was 125°C for both samples, while the concentration of each sample was 6.0 percent, all other measuring conditions were maintained constant. FIG. 5 shows the NMR spectrum of the room temperature mixture while FIG. 6 shows that of the synthetic resin prepared according to the method of this invention. According to the result of the synthetic resin of this example, the signal intensities of protons of the phenyl, methylene and methine radicals (represented by a, b and c respectively in FIG. 5 and 6) contained in the stylene composition are smaller than those of the room temperature mixture. From this it is evident that the synthetic resins prepared according to the method of this example are different from a mere blend of polyethylene and polystyrene.

EXAMPLE 3

Figure 7:
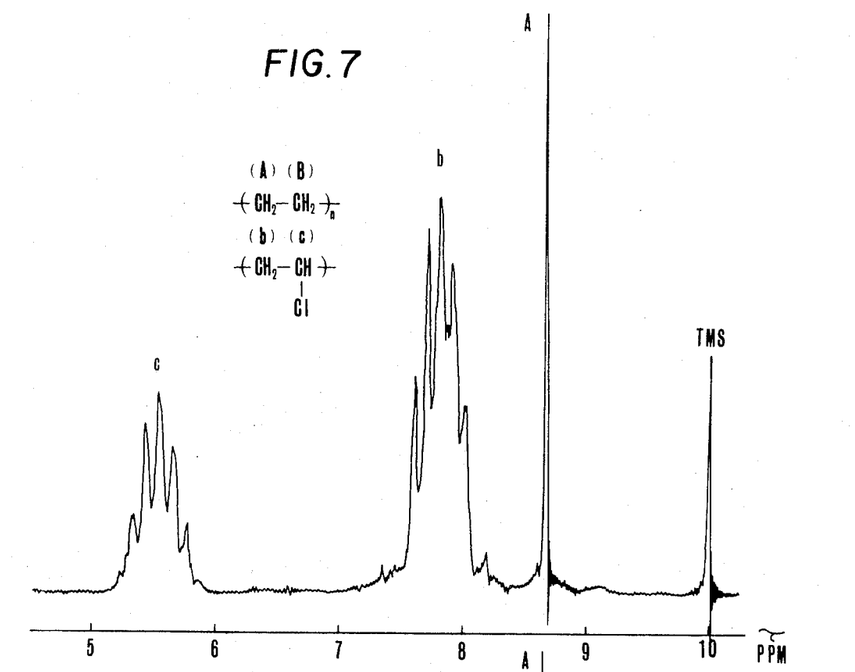
FIG. 7 shows a NMR spectrogram of a polyethylene-PVC synthetic resin (a mixture at room temperature) and
FIG. 8 shows a NMR spectrogram of the novel polyethylene polyvinyl chloride block-graft copolymer (polyethylene:powdery high-density polyethylene).
Figure 8:
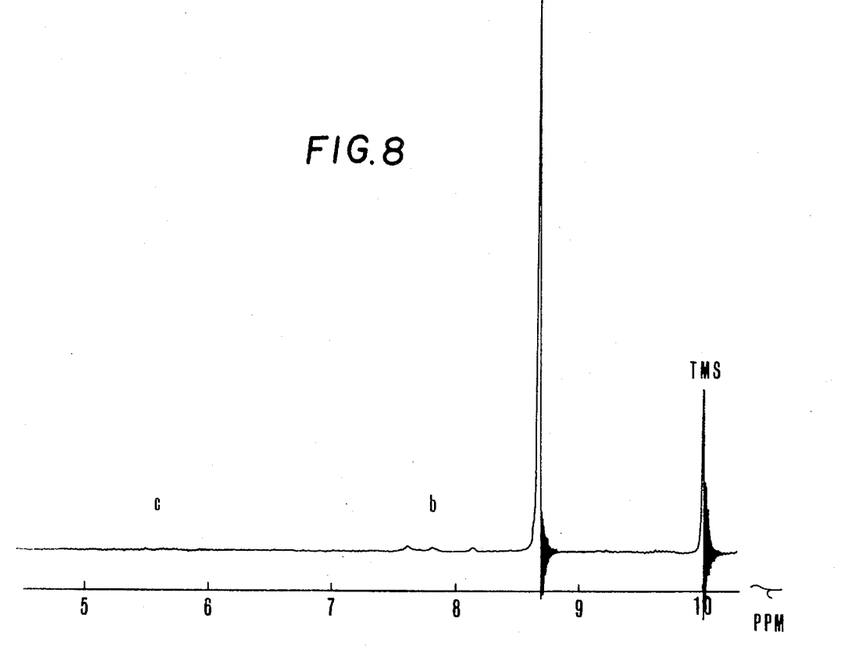

Again, in order to determine whether chemical change occurs or not in the composition when a mixture consisting of a powdery high density polyethylene resin not heat kneaded after polymerization and a vinyl polymerization type resin is heat kneaded in the presence of a radical forming catalyst, a powdery high density polyethylene resin having a melt index of 0.3 (ASTM D–1238) and a melt viscosity of 220,000 poise at a temperature of 190°C and under a rate of shear at 30 sec.$^{-1}$ (an ethylene-butene copolymer and incorporated with 0.05 part of ionol antioxidant) and a polyvinyl chloride resin having an average degree of polymerization of 800 and a melt viscosity of 330,000 poise at a temperature of 190°C and under a rate of shear at 30 sec.$^{-1}$ were admixed at room temperature at a weight ratio of 80 : 20. 0.05 part of 2,2-azobisiso butyronitrile acting as the radical forming catalyst was incorporated to the mixture and the resultant mixture was heat kneaded with a vented extruder provided with a nylon screw having a diameter of 40 mm and an effective length of 1,120 mm. The conditions of heat kneading treatment were: the resin temperature at the die portion was 200°C, the resin pressure at the discharge end of the screw was 220 kg/cm² and the number of revolutions of the screw was 29 rpm. NMR spectra were determined by means of a nuclear magnetic resonance device operating at 60 MHz on the synthetic resin prepared as above described and on a room temperature mixture consisting of the same type high density polyethylene resin once heat kneaded after polymerization and the same type polyvinyl chloride resin at a weight ratio of 80 : 20. Hydrogen protons were used as the nuclei, purified orthodichlorobenzene as the solvent. Measuring temperature was 140°C for both samples while the concentration of each sample was 6.0 percent. All other measuring conditions were maintained constant. FIG. 7 shows the MNR spectrum of the room temperature mixture whereas FIG. 8 that of the synthetic resin prepared in accordance wih the method of this example. According to the result of the synthetic resin of this example, the signal intensites of protons of the methylene and methine radicals (represented by $b$ and $c$ respectively in FIGS. 7 and 8) contained in the vinyl chloride component are smaller than those of the room temperature mixture. Thus, it is clear that the synthetic resin prepared by the method of this example is different from a mere blend of polyethylene and polyvinyl chloride.

EXAMPLE 4

In order to determine whether a chemical change occurs or not in the composition when a mixture of a powdery high density polyethylene resin not kneaded after polymerization and a vinyl polymerization type resin is heat kneaded in the presence of a radical forming catalyst, powdery high density polyethylene resins not kneaded after polymerization and respectively having melt indices of 0.3, 0.6 and 1.0 (ASTM D–1238) and melt viscosities of 220,000, 180,000 and 120,000, respectively, at a temperature of 190°C and under a rate of shear at 30 sec.$^{-1}$ (homopolymer and copolymers with butene and incorporated with 0.05 part of ionol antioxidant), were respectively mixed with a polystyrene resin having a flow rate of 3.5 (ASTM D–1238) and a melt viscosity of 160,000 poise at a temperature of 190°C and under a rate of shear at 30 sec.$^{-1}$, at room temperature and at a weight ratio of 90 : 10 and 80 : 20. 0.25 part of 2,2-azobisisobutyronitrile acting as the radical forming catalyst was incorporated into the mixtures and the resulting mixtures were heat kneaded. The apparatus and conditions of kneading employed in the heat kneading treatment were the same as in example 2. For comparison, the same high density polyethylene resin once kneaded after polymerization and the same type polystyrene resin were admixed at weight ratios of 90 : 10 and 80 : 20 respectively and 0.25 part of 2,2-azobisisobutyronitrile was incorporated to respective mixtures. These mixtures were heat kneaded with the same extruder and under the same conditions of extrusion as the case described above. These samples, the same type high density polyethylene resin, and polystyrene resin (each kneaded after incorporation of 0.25 part of 2,2-azobisisobutyronitrile) were pulverized to have a mean grain size of 250 $\mu$ and extraction test was carried out for each sample. Purified benzene was used as the solvent. For extraction, each sample of about 5.0 g. was immersed in the solvent of 500 ml and let stantstill for 15 days at room temperature, and the results of extraction are tabulated in table 4.

Table 4

|  | A | B |
|---|---|---|
| High density polyethylene resin [1] | 0.8 | 0.5 |
| 90/10 | 3.6 | 9.7 |
| 80/20 | 10.0 | 18.6 |
| Polystyrene resin | 99.1 | 99.1 |
| High density polyethylene resin [2] | 0.5 | 0.6 |
| 90/10 | 1.2 | 8.8 |
| 80/20 | 8.5 | 18.2 |
| Polystyrene resin | 99.1 | 99.1 |
| High density polyethylene resin [3] | 0.4 | 0.1 |
| 90/10 | 2.6 | 8.1 |
| 80/20 | 9.2 | 17.3 |
| Polystyrene resin | 99.1 | 99.1 |

[1]: Melt index 0.3, ethylene-butene copolymer.
[2]: Melt index 0.8, ethylene-butene copolymer.
[3]: Melt index 0.6, homopolymer.
A: Percentage of extraction of a kneaded mixture of a high density polyethylene not heat kneaded after polymerization and polystyrene.
B: Percentage of extraction of a kneaded mixture of a high density polyethylene and polystyrene once heat kneaded after polymerization.

Table 4 shows that the percentage of extraction of the synthetic resin of this example is lower than that of the mixture consisting of a not kneaded high density polyethylene and polystrene and kneaded by an extruder.

EXAMPLE 5

Again in order to determine whether a chemical change occurs or not in the composition when a mixture of a powdery high density polyethylene resin not kneaded after polymerization and a vinyl polymerization type resin is heat kneaded in the presence of a radical forming catalyst, various powdery high density polyethylene resins not kneaded after polymerization and having melt indices of 0.3, 0.6 and 1.0, respectively (ASTM D–1238) and melt viscosities of 220,000, 180,000 and 120,000 poise, respectively, at a temperature of 190°C and under a rate of shear at 30 sec.$^{-1}$ (homopolymer and copolymers with butene and each incorporated with 0.05 part of ionol antioxidant) and a polyvinyl chloride having an average degree of polymerization of 800, and a melt viscosity of 330,000 poise at a temperature of 190°C and under a rate of shear at 30 sec.$^{-1}$ were admixed at room temperature and at weight ratios of 90 : 10 80 : 20 respectively. 0.5 part of 2,2-azobisisobutyronitrile acting as the radical forming catalyst was added to each mixture and the resulting mixture was heat kneaded with the same heat kneading device and under the same kneading conditions as in example 3. For comparison, the same high density polyethylene resin once kneaded after polymerization was admixed with the same type polyvinyl chloride resin at weight ratios of 90 : 10 and 80 : 20, respectively. After incorporating 0.50 part of 2,2'-azobisisobutyronitrile, the mixtures were heat kneaded with the same extruder and under the same extrusion conditions as in the case described hereinabove. These samples, and samples of the same type high density polyethylene resins, polyvinyl chloride resin, each incorporated with 0.50 part of 2,2-azobisisobutyronitrile, were pulverized to have an average grain size of 250 $\mu$ and extraction test was carried out for each sample. Purified tetrahydrofuran was used as the solvent. For extraction, each sample weighing about 5.0 g. was immersed in the solvent of 500 ml, and was let standstill for 15 days at room temperature. The results of extraction are shown in table 5.

Table 5

|  | A | B |
| --- | --- | --- |
| High density polyethylene resin [1] | 0.3 | 0.3 |
| 90/10 | 0.2 | 8.7 |
| 80/20 | 2.4 | 19.0 |
| Polyvinyl chloride resin | 99.0 | 99.0 |
| High density polyethylene resin [2] | 0.3 | 0.1 |
| 90/10 | 0.2 | 7.9 |
| 80/20 | 1.8 | 18.2 |
| Polyvinyl chloride resin | 99.0 | 99.0 |
| High density polystyrene resin [3] | 0.3 | 0.4 |
| 90/10 | 0.5 | 9.1 |
| 80/20 | 9.8 | 18.5 |
| Polyvinyl chloride | 99.0 | 99.0 |

[1] Melt index 0.3, ethylene-butene copolymer.
[2] Melt index 0.8, ethylene-butene copolymer.
[3] Melt index 0.6, homopolymer.
A: Percentage of extraction of a kneaded mixture of a high density polyethylene not heat kneaded after polymerization.
B: Percentage of extraction of a kneaded mixture of a high density polyethylene once heat kneaded after polymerization and a polyvinyl chloride.

It is evident from table 5 that the percentage of extraction of the resin of this example is lower than that of a mixture consisting of a kneaded high density polyethylene and polyvinyl chloride and kneaded by an extruder which shows that the synthetic resin is different from a mere blend of polyethylene and polyvinyl chloride.

Above examples are shown to show the advantage of utilizing a polyethylene resin not kneaded after polymerization when preparing block or graft copolymers with vinyl polymerization type resins.

Following examples illustrate preferred embodiments of this invention.

EXAMPLE 6

A powdery high density polyethylene resin not kneaded after polymerization and having a melt index of 0.6 (ASTM D-1238) and a melt viscosity of 180,000 poise at a temperature of 190°C and under a rate of shear at 30 sec.$^{-1}$ and a saponified ethylene-vinyl acetate copolymer containing 40.1 mol percent of ethylene and having a degree of saponification of 99.1 percent, such as U.S. Pat. No. 3,419,654, a melt viscosity of 170,000 poise at a temperature of 190°C and a rate of shear at 30 sec.$^{-1}$ were admixed at room temperature and at weight ratios of 95 : 5 and 90 : 10 respectively. After incorporated with 0.20 part of 2,2'-azobisisobutyronitrile acting as the radical forming catalyst, the mixtures were heat kneaded with a vented extruder provided with a Dulmage type screw having a diameter of 40 mm and an effective length of 1,120 mm. The kneading conditions were: the resin temperature at the die portion was 205°C, the resin pressure at the discharge end of the screw was 335 kg/cm$^2$ and the number of revolutions was 45 rpm. The synthetic resinous composition kneaded in the above described manner was shaped into films having a mean thickness of 230 microns by T-die method and the measured values of the moisture permeability A of these (JIS Z 0208) are shown in table 6

Table 6

| HDPE*) / saponified ethylene-vinyl acetate copolymer | A |
| --- | --- |
| 100/0 | 4.1 |
| 95/5 | 2.0 |
| 90/10 | 2.2 |
| 0/100 | 21.0 |

*Melt index: 0.6 homopolymer.

Table 6 shows that films of the novel resinous compositions have much lower moisture permeability than those of the same type high density polyethylene resin along (4.1 g/m$^2$·day·50 $\mu$) and of the same type saponified ethylene-vinyl acetate copolymer (21.0 g/m$^2$·day·50 $\mu$) prepared by the same machine and under the same conditions as above described.

EXAMPLE 7

A powdery high density polyethylene resin not kneaded after polymerization having a melt index of 0.8 (ASTM D-1238) and a melt viscosity of 180,000 poise at a temperature of 190°C and under a rate of shear of 30 sec.$^{-1}$ and a saponified ethylene-vinyl acetate copolymer containing 40.1 mol percent of ethylene and having a degree of saponification of 99.1 percent, a melt viscosity of 170,000 poise at a temperature of 190°C and under a rate of shear at 30 sec.$^{-1}$ were admixed at room temperature and at weight ratios of 95 : 5 and 90 : 10 respectively. 0.25 part of 2,2'-azobisisobutyronitrile serving as the radical forming catalyst was added to the mixtures and the resulting mixtures were heat kneaded with a vented extruder provided with a Dulmage type screw, 40 mm diameter and 1,120 mm effective length. The kneading conditions were: the resin temperature at the die portion was 200°C, the resin pressure at the discharge end of the screw was 330 kg/cm$^2$ and the number of revolutions of the screw was 45 rpm. The resinous composition thus kneaded was formed into films having a mean thickness of 220 microns by T-die method and measured values of the moisture permeability A of the films (JIS Z 0208) are shown in table 7.

Table 7

| HDPE *) / saponified ethylene-vinyl acetate copolymer | A |
| --- | --- |
| 100/0 | 3.5 |
| 95/5 | 1.7 |
| 90/10 | 2.0 |
| 0/100 | 21.0 |

*Melt index: 0.8, ethylene-butene copolymer.

As can be clearly noted from table 7, the moisture permeability of the films of the novel resinous composition is much smaller than those of the same type high density polyethylene resin alone (3.5 g/m$^2$·day·50 $\mu$) and of the same type saponified ethylene-vinyl acetate copolymer alone (21.0 g/m$^2$·day·50 $\mu$).

EXAMPLE 8

A powdery high density polyethylene resin not kneaded after polymerization having a melt index of 0.07 (ASTM D–1238) and a melt viscosity of 510,000 poise at a temperature of 190°C and under a rate of shear at 30 sec.$^{-1}$ and a saponified ethylene-vinyl acetate copolymer containing 40.1 mol percent of ethylene and having a degree of saponification of 99.1 percent, and a melt viscosity of 170,000 poise at a temperature of 190°C and under a rate of shear at 30 sec.$^{-1}$ were admixed at room temperature at weight ratios of 95 : 5 and 90 : 10, respectively. After incorporated with 0.60 part of 2.2'-azobisisobutyronitrile acting as the radical forming catalyst the mixture was heat kneaded with a vented extruder provided with a Dulmage type screw, 40 mm diameter and 1,120 mm effective length. The kneading conditions were; the resin temperature at the die portion was 200°C, the resin pressure at the discharge end of the screw was 470 kg/cm² and the number of revolutions of the screw was 45 rpm. The kneaded resinous composition was shaped into thin films having an average thickness of 250 microns by T-die method and the measured values of the moisture permeability A of these sheets (JIS Z 0208) are shown in table 8.

Table 8

| HDPE *) / saponified ethylene-vinyl acetate copolymer | A |
|---|---|
| 100/0 | 3.7 |
| 95/5 | 2.1 |
| 90/10 | 2.7 |
| 0/100 | 21.0 |

*Melt index: 0.07, homopolymer.

As can be clearly noted from table 8, the moisture permeability of the films of the novel resinous composition is much lower than that of the films of the same type high density polyethylene resin alone (3.7 g/m²·day·50 $\mu$) and of the same type saponified ethylene-vinyl acetate copolymer (21.0 g/m²·day·50 $\mu$).

What is claimed is:

1. A block-graft copolymer of polyethylene and saponified ethylene-vinyl acetate copolymer which is formed by heating to an elevated temperature a mixture of polyethylene having a melt index of 0.6 to 0.8 and a saponified ethylene-vinyl acetate copolymer which has a degree of saponification of 99 percent or more and kneading the mixture in the presence of 0.2 to 0.6 parts by weight based on the weight of said mixture of a radical forming catalysts, said mixture being heated to a temperature from 200° to 205°C and kneaded under a pressure of 330 to 470 kg/cm², said saponified ethylene-vinyl acetate copolymer consisting of from 30 to 50 mol percent of ethylene, the remainder being vinyl acetate, said polyethylene being a powdery, high density polyethylene which has not been subjected to heating and kneading after polymerization, said mixture containing said high density polyethylene and said saponified ethylene-vinyl acetate copolymer at a weight ratio of 98:2 to 80:20.

2. The copolymer according to claim 1 wherein the ratio of said high density polyethylene and said saponified ethylene-vinyl acetate copolymer ranges from 95:5 to 90:10 by weight.

3. The copolymer according to claim 1 wherein said radical forming catalyst is 2,2'-azoisobisisobutyronitrile.

* * * * *